J. P. HENNESSY.
GYROSCOPE.
APPLICATION FILED DEC. 20, 1915.

1,289,170.

Patented Dec. 31, 1918.
2 SHEETS—SHEET 2.

Witness
Louis J. Barry
N. H. Evans

Inventor
John P. Hennessy

By

Attorney

UNITED STATES PATENT OFFICE.

JOHN PERCY HENNESSY, OF NEWPORT, RHODE ISLAND.

GYROSCOPE.

1,289,170.  Specification of Letters Patent.  Patented Dec. 31, 1918.

Application filed December 20, 1915. Serial No. 67,845.

*To all whom it may concern:*

Be it known that I, JOHN P. HENNESSY, a citizen of the United States, residing at 9 Kay St., Newport, in the county of Newport and State of Rhode Island, have invented certain new and useful Improvements in Gyroscopes, of which the following is a specification.

The object of my invention is to obtain continuous operation of a gyroscope by purely mechanical means of driving the wheel without interfering in any way with its action as described below.

As is well known, the useful effect of a gyroscope, when it forms part of an automatic steering arrangement in a torpedo, aeroplane, or other machine or vehicle, depends on the tendency of the gyroscope wheel, while it is revolving about its axis in any one plane, to resist any effort to change the direction of its axis so as to cause it to revolve in a plane not coincident with or parallel to the plane in which it was first started to revolve.

When the gyroscope wheel is mounted in gimbal rings and used in a steering arrangement, the action described above causes the relative motions of the gyroscope wheel and surrounding parts of the machine or vehicle in which it is used, to be of a very complex nature.

Owing to this latter fact and because it is essential to the successful operation of the steering arrangement that the action of the wheel as described above should not be interfered with in any way; it has not heretofore been found practicable to drive the gyroscope wheel so as to obtain continuous operation except by making the gyroscope wheel the armature of an electric motor or using some equivalent arrangement in which electricity is the motive power.

The use of electricity is objectionable in many cases, particularly where the machine or vehicle, steered by the gyroscope, is intended to carry explosives, as is the case in a torpedo.

Figure 1:
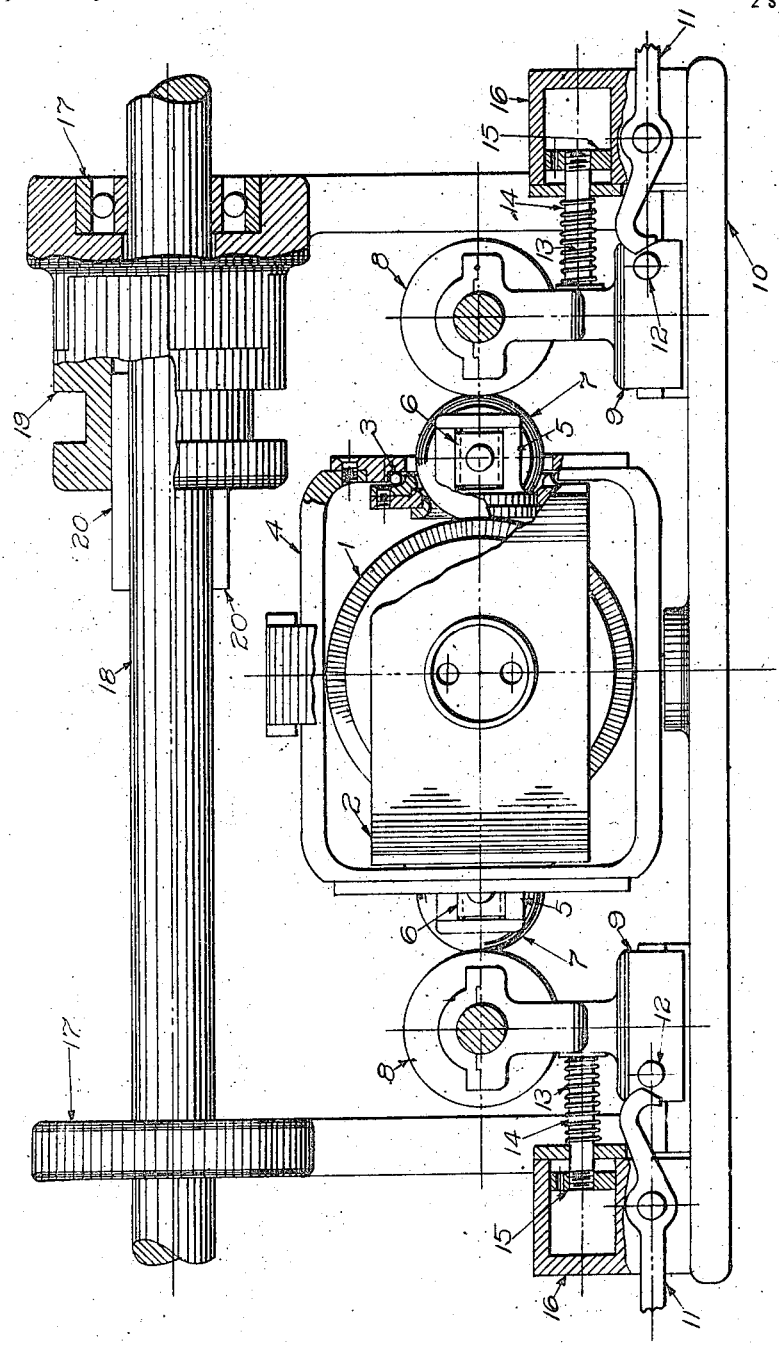
Figure 2:
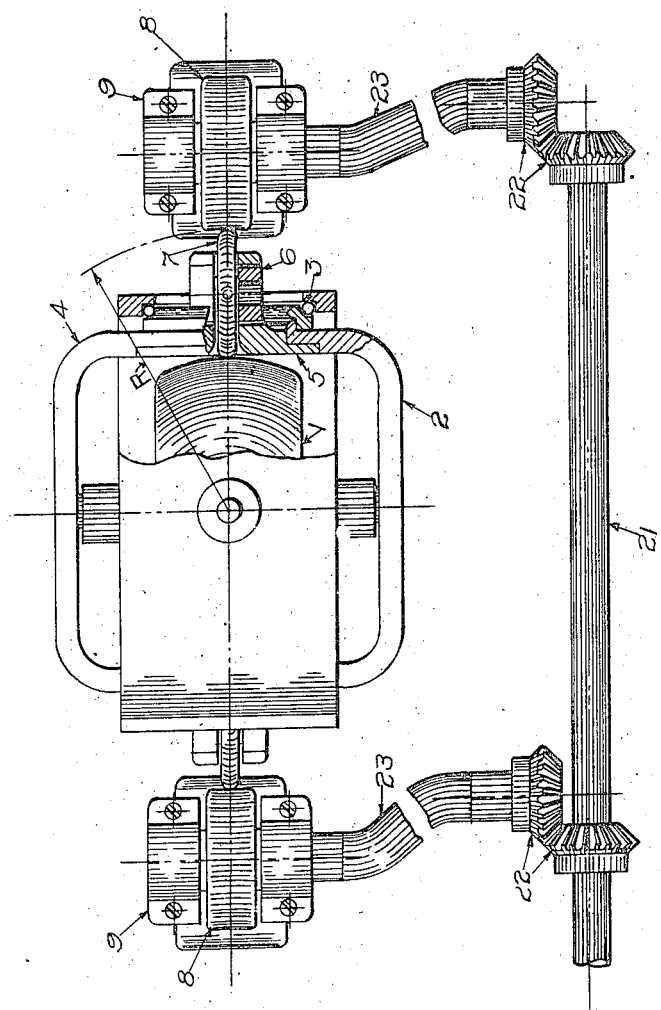

I attain this object by the mechanism illustrated in the accompanying drawings in which:

Figure 1 is a front view of the entire mechanism except the means of supplying power to the driving wheels. This is shown in Fig. 2 which is a top view of the gyroscope, gimbal rings, and driving mechanism. The mechanism as shown and described here is intended and adapted primarily for use in a marine torpedo but all claims are intended to apply equally to the use of the driving mechanism as a whole or of any of the essential combinations claimed by me, for the purpose of driving the gyroscope in an aerial torpedo, aeroplane or any machine or vehicle whatever.

Similar numbers refer to similar parts throughout both views.

In the arrangement shown number 1 designates the gyroscope wheel, which runs in bearings carried by the inner gimbal ring 2, which swings on bearings 3 on the outer gimbal ring 4 which in turn swings on vertical bearings at its top and bottom.

The bearings 3 are made in an annular shape and intermediate wheel supports 5 are inserted centrally in the opening and fastened by suitable means to the inner gimbal ring. Bearings 6, which carry the intermediate wheels 7, are so constructed and assembled as to be allowed a small amount of movement to and from the gyroscope wheel in the direction of the horizontal center line. The driving wheel 8 has its face made slightly concave in shape by cutting it on a radius R (Fig. 2) which is equal to the sum of the diameter of the intermediate wheel plus half of the diameter of the gyroscope wheel. It runs in bearings on the pedestal 9 which is arranged to slide back and forth a short distance on the swinging base 10. Said sliding is controlled by some suitable means such as that shown, in which 11 designates a catch which engages a pin 12. The catch is opened automatically by suitable means at the time of firing the torpedo. The spring 13 then pushes the pedestal forward. The piston rod 14 being fastened to the pedestal moves with it and pulls forward the piston 15 which moves in the oil cylinder 16. In the piston there is an orifice through which the oil flows as the piston moves. The length of time required to move the pedestal is determined principally by the relation between the strength of the spring, the quantity of oil in the cylinder and the size of the orifice.

The gyroscope complete with the mechanism which is directly controlled by it, together with the driving mechanism is fastened on the swinging base 10 and all necessary connections to other mechanism are made flexible so as to properly perform their several functions without interfering with the swing of the base. The swinging base is suspended by means such as the bearings 17 and bar 18 shown. The bearings are so located that the axis of the driving wheel 8 is exactly horizontal when the base is at rest and free to swing. The base can be locked, so as to prevent its swinging, by suitable means such as that shown in which 19 designates a clutch which slides on the bar 18 and is kept from turning by the keys 20.

The operation of the invention is as follows:—When the torpedo is being prepared for firing the pedestal 9 is pushed back and locked.

The swinging base is also locked in position so that the axes of the driving wheels are parallel to the longitudinal axis of the torpedo. The gyroscope wheel is centered by ordinary means, so that its axis is in the same plane with and parallel to the axes of the driving wheels. When the torpedo is fired the shaft 21 is caused to revolve by power supplied from some convenient source. This drives the bevel gears 22 which in turn drive the wheels 8 by means of flexible shafts 23. At the same time the gyroscope is started by ordinary means, such as a sudden impulse from a spring, and the centering pin is withdrawn leaving the gyroscope wheel spinning freely.

When the torpedo has completed its initial plunging and has settled down to its intended course, the swinging base is unlocked and at or about the same time the pedestals which were released at the time of firing, have moved forward so that the wheels 8 touch the wheels 7 and push them against the gyroscope wheel. Thus the power is transmitted by friction through the intermediate wheel to the gyroscope wheel. The velocity of the wheels 8 is regulated so that they will drive the gyroscope wheel at approximately the same speed and in the same direction as it was started.

When the swinging base is released it acts as a pendulum, swinging in the direction of the longitudinal center line of the torpedo, and thus maintains the outer gimbal ring always in a vertical position. In this way the plunging of the torpedo does not affect the gyroscope and the motion of the gyroscope wheel relative to the base and driving wheels is simplified.

As the torpedo swings slightly to the right and left, traveling in a sinusoidal course, the wheels 7 swing back and forth across the faces of the wheels 8 and remain always in contact with them. Thus it will be seen that the motion of the gyroscope around the vertical axis of the outer gimbal ring, which is the motion that governs the steering mechanism is not interfered with since the frictional resistance offered to the movement of the wheels 7 across the faces of the driving wheels can be made so slight as to be negligible. Moreover as the force is applied directly in line with the center of the gyroscope it has no moment about either the vertical axis, or the horizontal axis through the bearings of the inner gimbal ring, and hence has no tendency to tilt the gyroscope wheel from the plane in which it was started.

A similar result might be obtained by a somewhat different arrangement of parts and, therefore, I do not wish to limit myself to the specific construction shown and described. Although the revoluble frames in which the gyroscope wheel is mounted have been referred to in the specification and claims as gimbal rings, it will be understood that this term is intended to cover frames of any suitable construction for mounting the gyroscope wheel to swing about two right-angularly disposed and intersecting axes.

What I claim is:—

1. In a gyroscope, the combination with the gyroscope wheel, of a wheel adapted to contact therewith, a bearing for said wheel, and means for supporting said bearing.

2. In a gyroscope, the combination with the gyroscope wheel, of a wheel adapted to contact therewith, a bearing for said wheel, means for supporting said bearing, and means for allowing said wheel to move into and out of contact with the gyroscope wheel.

3. In a gyroscope, the combination with the gyroscope wheel, of a pair of gimbal rings in which the gyroscope wheel is mounted, a power-transmitting wheel adapted to contact with the gyroscope wheel, a bearing for said power-transmitting wheel, means for supporting said bearing, and means for attaching said support to one of the gimbal rings.

4. In a gyroscope, the combination with the gyroscope wheel, of a wheel adapted to contact therewith, a bearing for said wheel, means for supporting said bearing, and means for driving said wheel.

5. In a gyroscope, the combination with the gyroscope wheel, of a wheel adapted to contact therewith, a second wheel for driving said first-named wheel, and a movable bearing support for said second wheel.

6. In a gyroscope, the combination with the gyroscope wheel, of a gimbal ring in which the gyroscope wheel is mounted, said gimbal ring having an annular bearing, a power-transmitting wheel encircled by the bearing and adapted to drive the gyroscope wheel, and means for driving said power-transmitting wheel.

7. The combination with a gyroscope wheel and a pair of gimbal rings in which the wheel is mounted, of a swinging base adapted to support the gyroscope wheel and its gimbal rings, and means for locking and releasing the base against swinging movements, 8. The combination with a gyroscope wheel and a pair of gimbal rings in which the wheel is mounted, of a swinging base adapted to support the gyroscope wheel and its gimbal rings, and means for transmitting power to the periphery of the gyroscope wheel to drive the same, said means being at least partly carried by the swinging base.

9. In a gyroscope, the combination with the gyroscope wheel, of means to drive the same by peripheral engagement therewith.

10. In a gyroscope, the combination with the gyroscope wheel, of gimbal rings supporting the same, and mechanical means for driving the same by frictional engagement therewith.

11. In a gyroscope, the combination with the gyroscope wheel, of mechanical means for driving the same by frictional engagement with the periphery of the gyroscope wheel.

12. In a gyroscope, the combination with the gyroscope wheel, of a gimbal ring in which the gyroscope wheel is mounted, a support for said gimbal ring, and an annular bearing serving to mount said gimbal ring in the support, said annular bearing having a central opening, for the purpose described.

13. In a gyroscope, the combination with the gyroscope wheel, of a pair of gimbal rings in which the gyroscope wheel is mounted, and means for continuously driving the gyroscope wheel; said driving means being positioned externally of the gyroscope wheel.

14. In a gyroscope, the combination with the gyroscope wheel, of a pair of gimbal rings in which the gyroscope wheel is mounted, driving means for the gyroscope wheel positioned externally of said gimbal rings, and means carried by one of said gimbal rings to transmit power from said driving means to the gyroscope wheel.

15. In a gyroscope, the combination with the gyroscope wheel, of a pair of gimbal rings in which the gyroscope wheel is mounted, driving means for the gyroscope wheel positioned externally of said gimbal rings, the gyroscope wheel and the driving means being capable of changing their angular relation and the driving means being operative for driving the gyroscope wheel regardless of such angular changes.

16. The combination with a gyroscope, of driving means therefor, the gyroscope and driving means being capable of changing their angular relation and the driving means being operative for driving the gyroscope regardless of such angular changes.

17. In a gyroscope, the combination with the gyroscope wheel, of means for driving said wheel, said means being normally retained in an inoperative position, means for releasing said driving means, and means for retarding movement of the driving means to its operative position.

18. The combination with a gyroscope wheel, of normally inoperative driving means therefor, means for rendering said driving means effective, and means for retarding the operation of said last-named means, for the purpose described.

19. The combination with a gyroscope wheel, of normally inoperative driving means therefor, and means to render the driving means effective for transmitting rotation to the gyroscope wheel, said means being designed to delay transmission of rotation to the gyroscope wheel for a predetermined period.

20. The combination with a gyroscope wheel, of a pair of gimbal rings supporting the same, a swinging base on which said gimbal rings are mounted, and means for transmitting power to the periphery of the gyroscope wheel, said means being at least partly mounted on the top of the swinging base.

JOHN PERCY HENNESSY.

Witnesses:
FRANCIS L. CONNORS,
LEANDER H. SMITH.